US011474985B2

(12) United States Patent
Nasu (10) Patent No.: US 11,474,985 B2
(45) Date of Patent: Oct. 18, 2022

(54) DATA PROCESSING APPARATUS, METHOD, AND RECORDING MEDIUM

(71) Applicant: Mitsubishi Electric Corporation, Tokyo (JP)

(72) Inventor: Osamu Nasu, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/610,703

(22) PCT Filed: Jul. 23, 2019

(86) PCT No.: PCT/JP2019/028767
§ 371 (c)(1),
(2) Date: Nov. 12, 2021

(87) PCT Pub. No.: WO2021/014550
PCT Pub. Date: Jan. 28, 2021

(65) Prior Publication Data
US 2022/0147501 A1 May 12, 2022

(51) Int. Cl.
*G06F 16/00* (2019.01)
*G06F 16/215* (2019.01)
*G06F 16/22* (2019.01)

(52) U.S. Cl.
CPC ........ *G06F 16/215* (2019.01); *G06F 16/2255* (2019.01)

(58) Field of Classification Search
CPC ............................ G06F 16/215; G06F 16/2255
See application file for complete search history.

(56) References Cited

U.S. PATENT DOCUMENTS 10,963,586 B1 * 3/2021 Sculley ............... G06F 16/2379
2018/0088548 A1 3/2018 Sangi

FOREIGN PATENT DOCUMENTS

JP 2002-73893 A 3/2002
JP 2009-53992 A 3/2009
(Continued)

OTHER PUBLICATIONS

International Search Report and Written Opinion dated Oct. 8, 2019, received for PCT Application PCT/JP2019/028767, Filed on Jul. 23, 2019, 9 pages including English Translation.
(Continued)

*Primary Examiner* — Alexander Khong
(74) *Attorney, Agent, or Firm* — Xsensus LLP (57) ABSTRACT

An identification value generator included in a data processing apparatus generates, from data pieces collected from an FA device, at least one identity identification value. The identity identification value is a value for determining an identity of the data pieces. The update determiner determines whether current data and previous data are identical based on a current identification value and a previous identification value. The current data includes the data pieces currently collected, and the previous data includes the data pieces previously collected. The current identification value includes the identity identification value generated from the current data, and the previous identification value includes the identity identification value generated from the previous data. A data distribution controller distributes the current data to a data processor when the update determiner determines that the current data and the previous data are not identical.

13 Claims, 7 Drawing Sheets

(56) References Cited

FOREIGN PATENT DOCUMENTS

| | | |
|---|---|---|
| JP | 2009-238127 A | 10/2009 |
| JP | 2010-182243 A | 8/2010 |
| JP | 2015-108927 A | 6/2015 |
| JP | 2018-515865 A | 6/2018 |
| WO | 2016/155856 A1 | 10/2016 |

OTHER PUBLICATIONS

Notice of Reasons for Refusal dated Mar. 31, 2020, received for Japanese Application 2019-569511, 8 pages Including English Translation.

International Search Report and Written Opinion dated Oct. 8, 2019, received for PCT Application PCT/JP2019/028767, filed Jul. 23, 2019, 9 pages including English Translation.

Notice of Reasons for Refusal dated Mar. 31, 2020, received for Japanese Application 2019-569511, 8 pages ncluding English Translation.

Decision to Grant dated Aug. 11, 2020, received for Japanese Application 2019-569511, 5 pages including English Translation.

* cited by examiner

DATA PROCESSING APPARATUS, METHOD, AND RECORDING MEDIUM

CROSS-REFERENCE TO RELATED APPLICATION

The present application is based on PCT filing PCT/JP2019/028767, filed Jul. 23, 2019, the entire contents of which are incorporated herein by reference.

TECHNICAL FIELD

The present disclosure relates to a data processing apparatus, a method, and a program.

BACKGROUND ART

Data analysis is used in various fields for various purposes including monitoring, failure prediction, and demand analysis. In factory automation, for example, a system for monitoring the operation status of a factory production line and predicting failures on the line may use a data collection application that collects various sets of data from devices, and a data processing application that processes, analyzes, and diagnoses the collected data or performs other processing.

For example, the data collection application collects, from factory automation (FA) devices, output value data from sensors included in FA devices at predetermined time intervals and transmits the collected data to the data processing application. However, the output values from the sensors collected from the FA devices at predetermined time intervals may remain unchanged. For such unchanged data, the data processing application can normally perform the processing without sequentially receiving the data.

Although the output value from the sensor remains unchanged, the data collection application transmits the data to the data processing application at predetermined time intervals, increasing the load associated with the data distribution processing and the communication traffic.

To reduce the load associated with the data distribution processing and the communication traffic, collected data may be transmitted simply when the data has been updated as described in, for example, Patent Literature 1. In the system described in Patent Literature 1, a terminal functions as a distributer, and acquires hypertext markup language (HTML) data identified by a user-specified uniform resource identifier (URI) from a server on a network and distributes the acquired HTML data to a data collection node that analyzes the HTML data.

To reduce the communication traffic, the terminal transmits the updated HTML data alone to the data collection node. The terminal compares a hash value calculated from the currently acquired HTML data with a hash value calculated from the previously acquired HTML data to determine whether the HTML data has been updated. When the hash values are determined not to be identical through the hash value comparison, the terminal determines that the HTML data has been updated and then transmits the HTML data to the data collection node.

CITATION LIST

Patent Literature

Patent Literature 1: Unexamined Japanese Patent Application Publication No. 2010-182243

SUMMARY OF INVENTION

Technical Problem

In the structure described in Patent Literature 1, HTML data browsed by a user is to be collected, and the number of data pieces to be collected is not expected to be large. In other words, the terminal is not expected to be under an extremely large load in determining whether data has been updated. However, when a large number of data pieces is collected, the terminal functioning as a distributer is to calculate a hash value for each of the data pieces and to compare the hash values for each of the data pieces. This complicates the processing performed by the distributer and increases the processing load. In factory automation, for example, a distributer may distribute a large number of data pieces periodically collected from devices to a data processor that performs predetermined data processing. When the structure described in Patent Literature 1 is used for this processing sequence, the communication traffic between the distributer and the data processor may be reduced but the distributer frequently performs processing for determining whether each data piece has been updated, thus complicating the processing performed by the distributer and increasing the processing load on the distributer.

In response to the above issue, an objective of the present disclosure is simpler data distribution processing with a smaller load.

Solution to Problem

To achieve the above objective, identification value generation means included in a data processing apparatus calculates, from a plurality of data pieces collected from a device, at least one identity identification value with a predetermined sequence. The identity identification value is a value for determining an identity of the plurality of data pieces. Determination means determines whether current data and previous data are identical based on whether a current identification value and a previous identification value are identical. The current data includes the plurality of data pieces currently collected, and the previous data includes the plurality of data pieces previously collected. The current identification value includes the identity identification value generated from the current data, and the previous identification value includes the identity identification value generated from the previous data. Distribution means distributes the current data to data processing means for performing predetermined data processing when the determination means determines that the current data and the previous data are not identical.

Advantageous Effects of Invention

The data processing apparatus according to the above aspect of the present disclosure determines whether a current identification value generated from multiple currently collected data pieces and a previous identification value generated from multiple previously collected data pieces are identical, and then determines, based on the result, whether the currently collected data pieces and the previously collected data pieces are identical. Upon determining that the currently collected data pieces and the previously collected data pieces are not identical, the data processing apparatus distributes the currently collected data to data processing means for performing predetermined data processing. In other words, the determination as to whether data is to be distributed may be performed with a simpler sequence with a smaller processing load.

DESCRIPTION OF EMBODIMENTS

Embodiments

A data processing apparatus according to one or more embodiments of the present disclosure will now be described with reference to the drawings.

Figure 1:
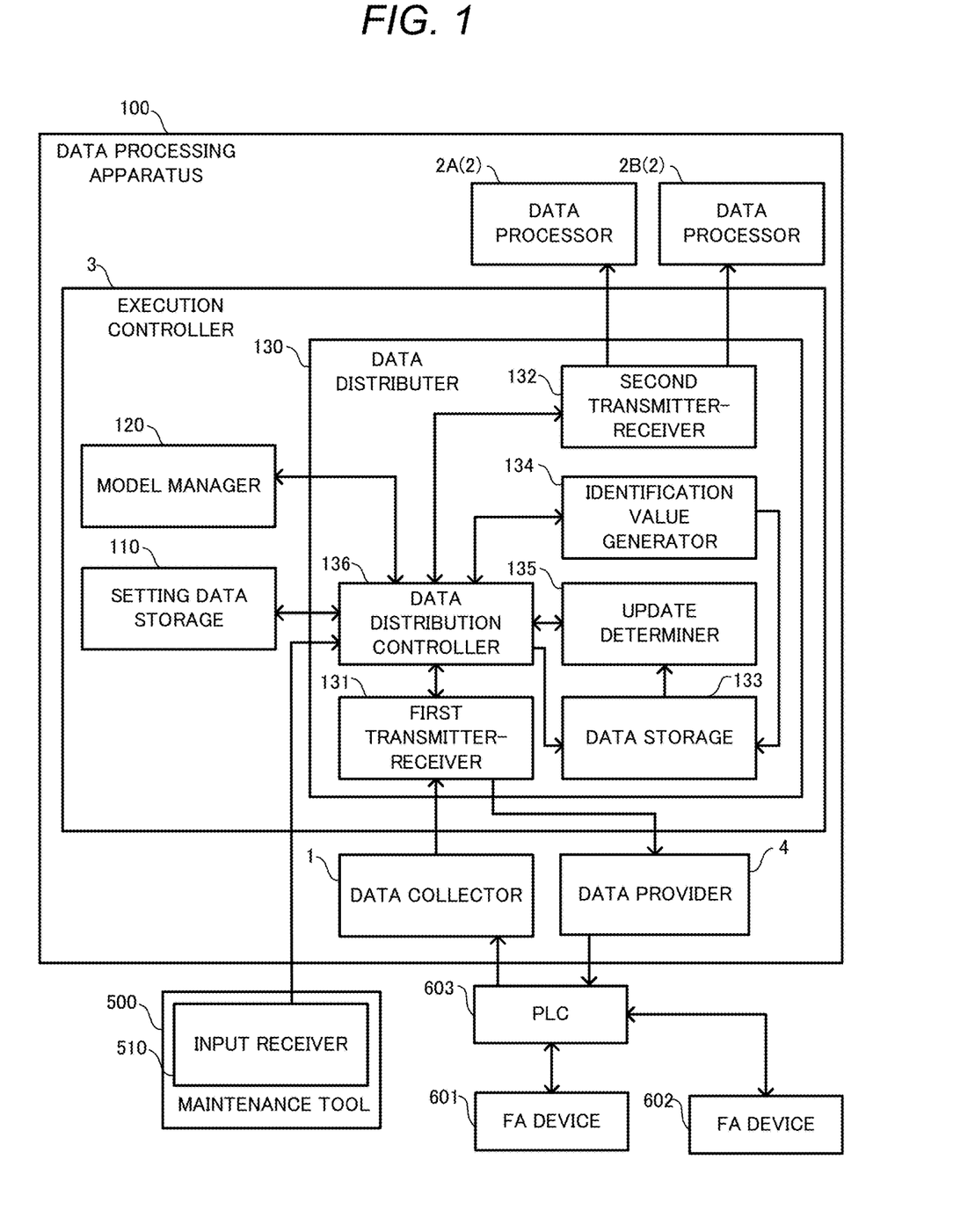
FIG. 1 is a functional block diagram of a data processing apparatus and a maintenance tool according to an embodiment of the present disclosure.

A data processing apparatus 100 shown in FIG. 1 collects, for example, data output from factory automation (FA) devices 601 and 602 located at a factory. For example, the data processing apparatus 100 analyzes collected data to diagnose the FA devices 601 and 602 for maintenance, such as preventive maintenance or predictive maintenance, and transmits a diagnosis result to a programmable logic controller 603 (hereafter, PLC 603) that controls the FA devices 601 and 602. For example, the data processing apparatus 100 transmits, to the PLC 603, a diagnosis result including alert information indicating that the FA devices 601 and 602 have deteriorated and are to undergo maintenance before any failure occurs.

The data processing apparatus 100 is, for example, an industrial personal computer (IPC) placed at the same factory as the FA devices 601 and 602. The FA devices 601 and 602 are, for example, mechanical devices used in a production line at a factory. The FA devices 601 and 602 include sensors such as vibration sensors, temperature sensors, pressure sensors, and flow rate sensors. The PLC 603 controls the FA devices 601 and 602.

The sensors included in the FA devices 601 and 602 output values to the PLC 603. The data processing apparatus 100 collects, from the PLC 603, the output values from the sensors included in the FA devices 601 and 602.

The data processing apparatus 100 collects data in accordance with a user-specified setting for data collection. The setting for data collection may hereafter also be referred to as a collection setting. The collection setting defines, for example, devices from which data is to be collected, the time intervals of data collection, and data to be collected. For example, the data processing apparatus 100 collects specified data from a specified collection target at specified time intervals. The data processing apparatus 100 may also collect data at irregular timing. For example, the data processing apparatus 100 may collect specified data when a predetermined condition is satisfied, such as when a user has performed a specific operation or when a diagnosis result is out of the tolerance. The data processing apparatus may collect data at predetermined time intervals and also when a predetermined condition is satisfied.

The data processing apparatus 100 may include multiple processors for implementing various functions corresponding to a series of processes. To allow the processors to function as specified, a data processing sequence indicating, for example, the details of each process and the order of the processes is predefined. The data processing apparatus 100 includes data representing a setting for a data processing sequence. Each processor in the data processing apparatus 100 performs processing on collected data in accordance with the defined setting for a data processing sequence. The predefined setting for a data processing sequence will hereafter be referred to as a data processing sequence setting.

A maintenance tool 500 is a tool that is used by a user to, for example, register the collection setting with the data processing apparatus 100. The maintenance tool 500 is, for example, a personal computer storing a dedicated application installed. The maintenance tool 500 provides data representing the collection setting to the data processing apparatus 100 as instructed by the user. The maintenance tool 500 provides data representing the data processing sequence setting to the data processing apparatus 100 as instructed by the user. The maintenance tool 500 transmits a signal for instructing to start a processing sequence to the data processing apparatus 100 as instructed by the user.

Figure 2:
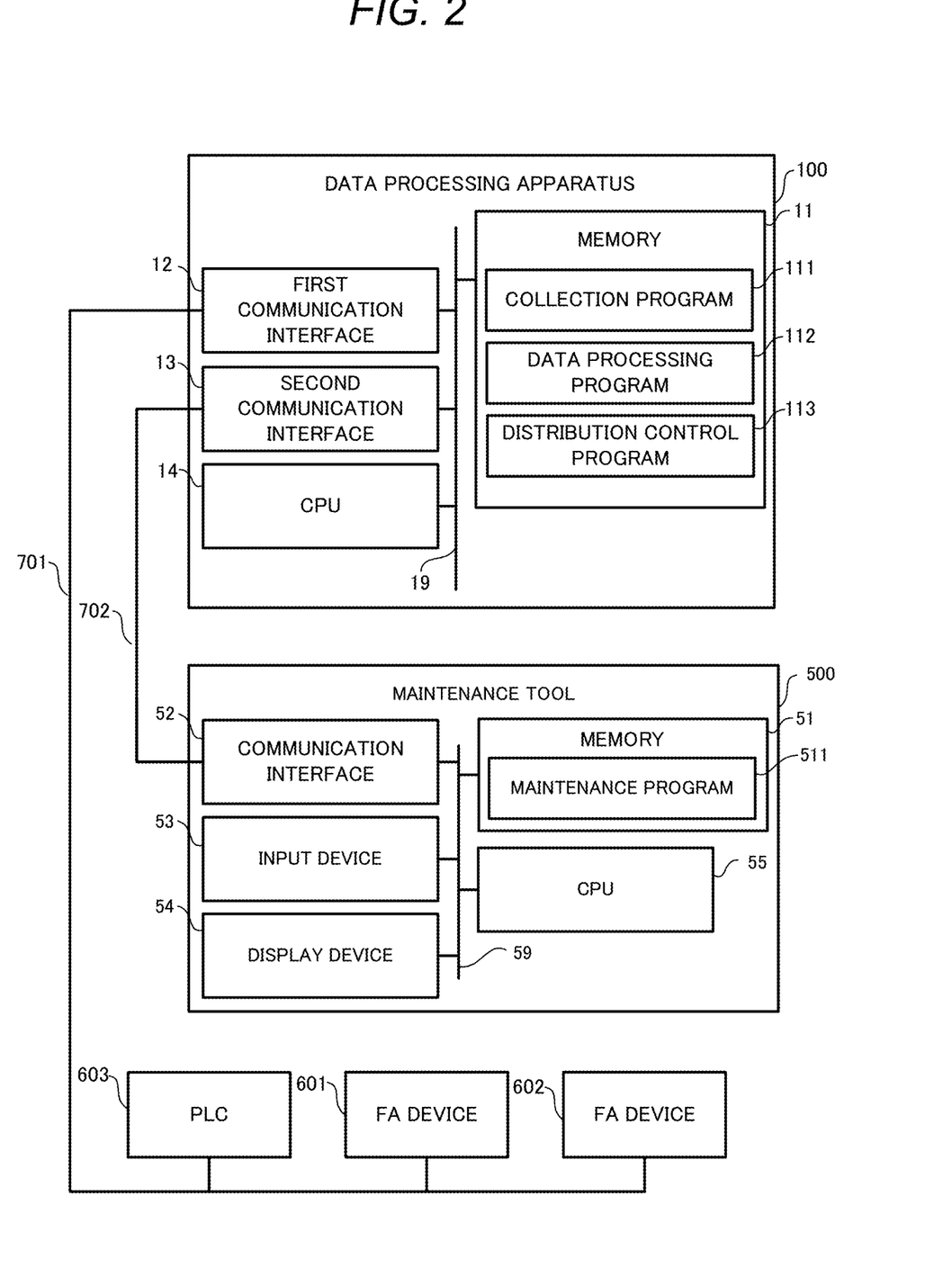
FIG. 2 is a hardware diagram of the data processing apparatus and the maintenance tool according to the embodiment.

The hardware components of each apparatus or device will now be described. As shown in FIG. 2, the data processing apparatus 100 includes, as hardware components, a memory 11 that stores various programs and data, a first communication interface 12 that communicates with other devices through a network 701, a second communication interface 13 that communicates with other devices through a communication cable 702, and a central processing unit (CPU) 14 that centrally controls the data processing apparatus 100. The memory 11, the first communication interface 12, and the second communication interface 13 are connected to the CPU 14 with a bus 19 to communicate with the CPU 14.

The memory 11 includes a volatile memory and a nonvolatile memory. The memory 11 stores programs for causing the data processing apparatus 100 to perform various functions. More specifically, the memory 11 stores a collection program 111, a data processing program 112, and a distribution control program 113. The memory 11 also serves as a working memory for the CPU 14.

The collection program 111 causes the data processing apparatus 100 to collect data from the PLC 603. The data processing program 112 causes the data processing apparatus 100 to perform predetermined data processing on collected data. The predetermined data processing is, for example, analysis processing and diagnostic processing. The distribution control program 113 causes the data processing apparatus 100 to control distribution of collected data.

The first communication interface 12 includes a network interface circuit and communicates with the PLC 603 through the network 701 under the control of the CPU 14. The network 701 is in accordance with a fieldbus standard.

The second communication interface 13 includes, for example, a universal serial bus (USB) controller, and communicates with the maintenance tool 500 through the communication cable 702 as controlled by the CPU 14. The communication cable 702 is, for example, a USB cable.

The CPU 14 executes various programs stored in the memory 11 to cause the data processing apparatus 100 to implement various functions. More specifically, the CPU 14 executes the collection program 111 to collect data from the PLC 603. The CPU 14 executes the data processing program 112 to perform predetermined data processing on collected data. The CPU 14 executes the distribution control program 113 to control data distribution.

The maintenance tool 500 includes, as hardware components, a memory 51 that stores programs and data, a communication interface 52 that transmits and receives data to and from other devices through the communication cable 702, an input device 53 that detects an input operation by the user, a display device 54 that displays images, and a CPU 55 that centrally controls the maintenance tool 500. The memory 51, the communication interface 52, the input device 53, and the display device 54 are connected to the CPU 55 with a bus 59 and communicate with the CPU 55.

The memory 51 includes a volatile memory and a nonvolatile memory. The memory 51 stores programs for causing the maintenance tool 500 to implement various functions. More specifically, the memory 51 stores a maintenance program 511. The memory 51 also serves as a working memory for the CPU 55.

The maintenance program 511 causes the maintenance tool 500 to provide various setting data sets to the data processing apparatus 100 and to provide a signal for instructing to start collection processing to the data processing apparatus 100. The various setting data sets include data representing the collection setting and data representing the data processing sequence setting.

The communication interface 52 includes, for example, a USB controller, and communicates with the data processing apparatus 100 through the communication cable 702 as controlled by the CPU 55.

The input device 53 includes, for example, a mouse and operation keys, and receives an input operation by the user and then outputs a signal representing the user-input operation to the CPU 55. The display device 54 includes a display, and displays an image in accordance with a signal provided by the CPU 55 on the display.

The CPU 55 executes various programs stored in the memory 51 to cause the maintenance tool 500 to implement various functions. More specifically, the CPU 55 executes the maintenance program 511 to transmit various setting data input by the user to the data processing apparatus 100. The CPU 55 also executes the maintenance program 511 to transmit a signal for instructing to start collection processing to the data processing apparatus 100.

The functional components of the data processing apparatus 100 will now be described with reference to FIG. 1. The data processing apparatus 100 includes, as functional components, a data collector 1 that collects data from a collection target, a data processor 2 that performs predetermined data processing on collected data, an execution controller 3 that controls distribution, and a data provider 4 that provides data output from the execution controller 3 to the PLC 603. The arrows in FIG. 1 indicate the directions of flow of, for example, data and signals between the components of the data processing apparatus 100.

The data collector 1 collects, from the PLC 603, data including the output values from the sensors included in the FA devices 601 and 602. For example, upon receiving a signal instructing to start collection processing from the execution controller 3, the data collector 1 starts collection processing to collect specified data from a specified target at specified collection intervals. The data collector 1 then provides the collected data to the execution controller 3. The functions of the data collector 1 are implemented by the CPU 14 shown in FIG. 2 executing the collection program 111. The data collector 1 is an example of collection means in an aspect of the present disclosure.

The data processor 2 shown in FIG. 1 includes data processors 2A and 2B. For example, the data processor 2A analyzes data provided from the execution controller 3. The data processor 2B diagnoses the FA devices 601 and 602 based on the analysis result, and transmits data representing a diagnosis result to the execution controller 3. The data processor 2 may also perform processing other than analysis or diagnosis. The functions of the data processor 2 are implemented by the CPU 14 shown in FIG. 2 executing the data processing program 112. The data processor 2 is an example of data processing means in an aspect of the present disclosure.

The execution controller 3 distributes, for example, collected data to each component of the data processing apparatus 100 in accordance with a defined data processing sequence. The execution controller 3 includes a setting data storage 110 that stores data representing a data processing sequence setting, a model manager 120 that manages data defining a data model, and a data distributer 130 that functions as a main component in data distribution processing.

In the embodiment, the execution controller 3 does not distribute all the data collected by the data collector 1 to the data processor 2. As described above, the data collector 1 collects output values from the sensors included in the FA devices 602 and 603. When the output value from the sensor remains unchanged, the execution controller 3 does not distribute the collected data to the data processor 2. For example, the sensor measures temperature. In this case, when the currently collected temperature data remains unchanged from the previously collected temperature data, the execution controller 3 does not distribute the data to the data processor 2.

When receiving no data distributed from the execution controller 3, the data processor 2 performs data processing with the previously distributed data. With the previously and currently collected output values from the sensor identical to each other, the data processing may be performed by the data processor 2 using either the previously distributed data or the currently distributed data. The data processing apparatus 100 with the above structure may have a reduced communication traffic between the execution controller 3 and the data processor 2. In another embodiment, the data processor 2 may perform data processing for changed data alone. In this case, the data processor 2 does not perform data processing until the execution controller 3 distributes data.

The execution controller 3 in the embodiment determines whether data has changed in a set of data pieces as one unit in a predetermined range instead of in each of the collected data pieces.

The setting data storage 110 stores data representing a data processing sequence setting. The data representing a data processing sequence setting includes data defining data processing to be performed on collected data, a main component performing the data processing, and the sequence of the data processing.

The setting data storage 110 also stores data representing a collection setting for data collection processing performed by the data collector 1. The data representing a collection setting includes data for identifying a collection target, data for identifying data to be collected, and data for identifying the time interval for data collection. The user stores the data representing the data processing sequence setting and the data representing the collection setting into a predetermined area of the memory 11 using the maintenance tool 500. The functions of the setting data storage 110 are implemented by the memory 11 shown in FIG. 2.

Figure 3:
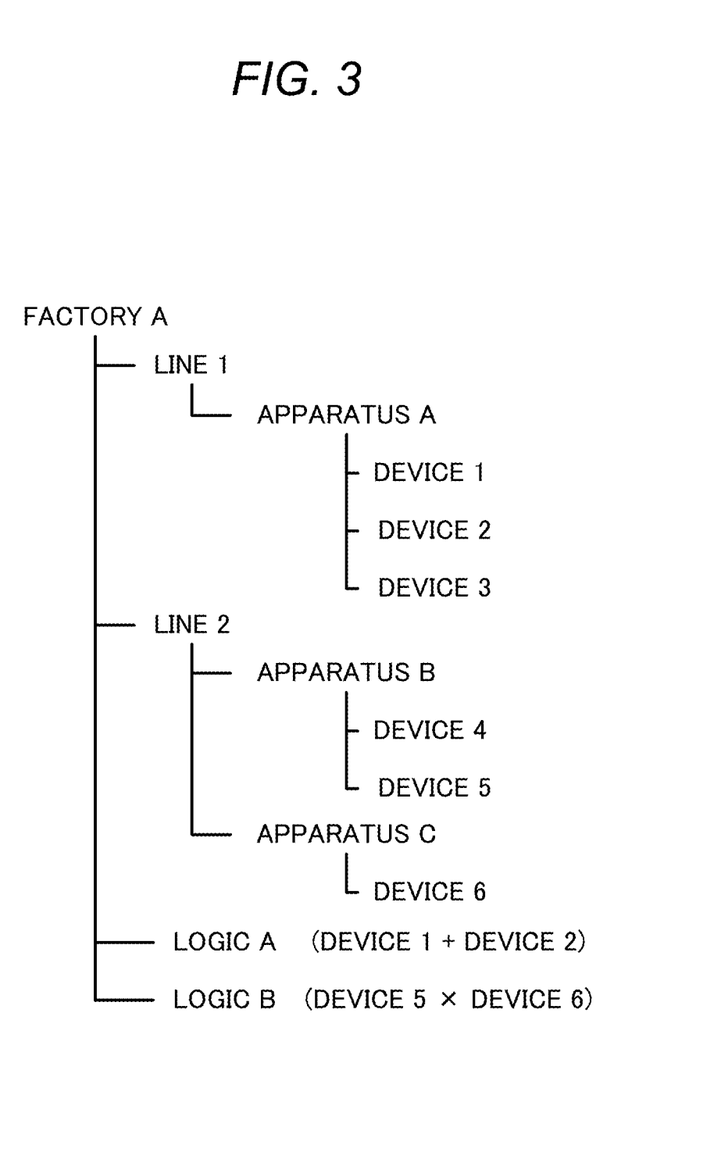
FIG. 3 is a diagram showing an example data model in the embodiment.

The model manager 120 shown in FIG. 1 manages definition information with modeled data to be collected by the data processing apparatus 100. In the embodiment, the data processing apparatus 100 models data to be collected and manages the data. More specifically, the data processing apparatus 100 handles data to be collected as data with a hierarchy shown in FIG. 3. The data model is not limited to data with a hierarchy. The functions of the model manager 120 are implemented by the memory 11 shown in FIG. 2.

The data distributer 130 shown in FIG. 1 includes a first transmitter-receiver 131 that transmits data to the data provider 4 and receives data from the data collector 1, a second transmitter-receiver 132 that transmits and receives data to and from the data processor 2, a data storage 133 that stores collected data, an identification value generator 134 that generates an identification value from collected data, an update determiner 135 that determines whether collected data has been updated, and a data distribution controller 136 that controls the components of the data distributer 130. The functions of the data distributer 130 are implemented by the CPU 14 shown in FIG. 2 executing the distribution control program 113. The identification value generator 134 is an example of identification value generation means in an aspect of the present disclosure. The update determiner 135 is an example of determination means in an aspect of the present disclosure. The data distribution controller 136 is an example of distribution means in an aspect of the present disclosure.

The first transmitter-receiver 131 shown in FIG. 1 functions as an interface that communicates data with the data collector 1. The first transmitter-receiver 131 outputs data received from the data collector 1 to the data distribution controller 136. The first transmitter-receiver 131 transmits data provided from the data distribution controller 136 to the data provider 4.

The second transmitter-receiver 132 functions as an interface for communicating data with the data processor 2. The second transmitter-receiver 132 transmits data provided from the data distribution controller 136 to the data processor 2. The second transmitter-receiver 132 outputs data received from the data processor 2 to the data distribution controller 136.

The data storage 133 shown in FIG. 1 temporarily stores data collected by the data collector 1. The data distribution controller 136 stores data provided from the first transmitter-receiver 131 into the data storage 133. The identification value generator 134 (described later) stores a hash value calculated from collected data into the data storage 133.

The identification value generator 134 shown in FIG. 1 calculates at least one hash value from data currently collected by the data collector 1 and provides the calculated hash value to the update determiner 135. The identification value generator 134 also stores the hash value into the data storage 133. The calculated hash value is an identification value used to determine whether the data currently collected by the data collector 1 is identical to the previously collected data. A hash function used to calculate the hash value is predefined, and definition information indicating the hash function is stored in the memory 11. The hash value is an example of an identity identification value in an aspect of the present disclosure.

As described above, the data processing apparatus 100 determines whether data has changed in a set of data pieces as one unit. The identification value generator 134 then generates a hash value in the manner described below. The data collector 1 may collect multiple data pieces. For example, the data collector 1 collects numerical data such as "1" and "0.01", data representing "True" or "False", and data representing a character string such as "AB" and "D". The identification value generator 134 concatenates multiple data pieces in a predetermined order. For example, the identification value generator 134 may concatenate multiple data pieces in the order of when the data collector 1 has provided each data piece to the data distributer 130. The identification value generator 134 may also sort data pieces in ascending or descending order of the data names representing the data pieces and concatenate the sorted data pieces. In another embodiment, the identification value generator 134 may sort data pieces in a user-specified order and concatenate the sorted data pieces. In another embodiment, the identification value generator 134 may, for example, directly concatenate data pieces, such as "1TrueAB". In another embodiment, the identification value generator 134 may concatenate data pieces with a specified delimiter, such as "1,True,AB", "1;True:AB", and "1 True AB". The identification value generator 134 then calculates a hash vale from the concatenated value.

In the embodiment, the identification value generator 134 inputs all the data pieces read from the data storage 133 into a defined hash function to calculate a hash value. The identification value generator 134 stores the current hash value into the data storage 133. The identification value generator 134 calculates a hash value for a set of data pieces provided from the data collector 1, instead of for each of the data pieces.

The identification value generator 134 may calculate two or more hash values. The number of hash values calculated may be less than the number of collected data pieces. When the number of hash values to be calculated is greater than or equal to the number of collected data pieces, the load of the calculation processing may not be lighter than a simple comparison between previous data and current data.

Figure 4:
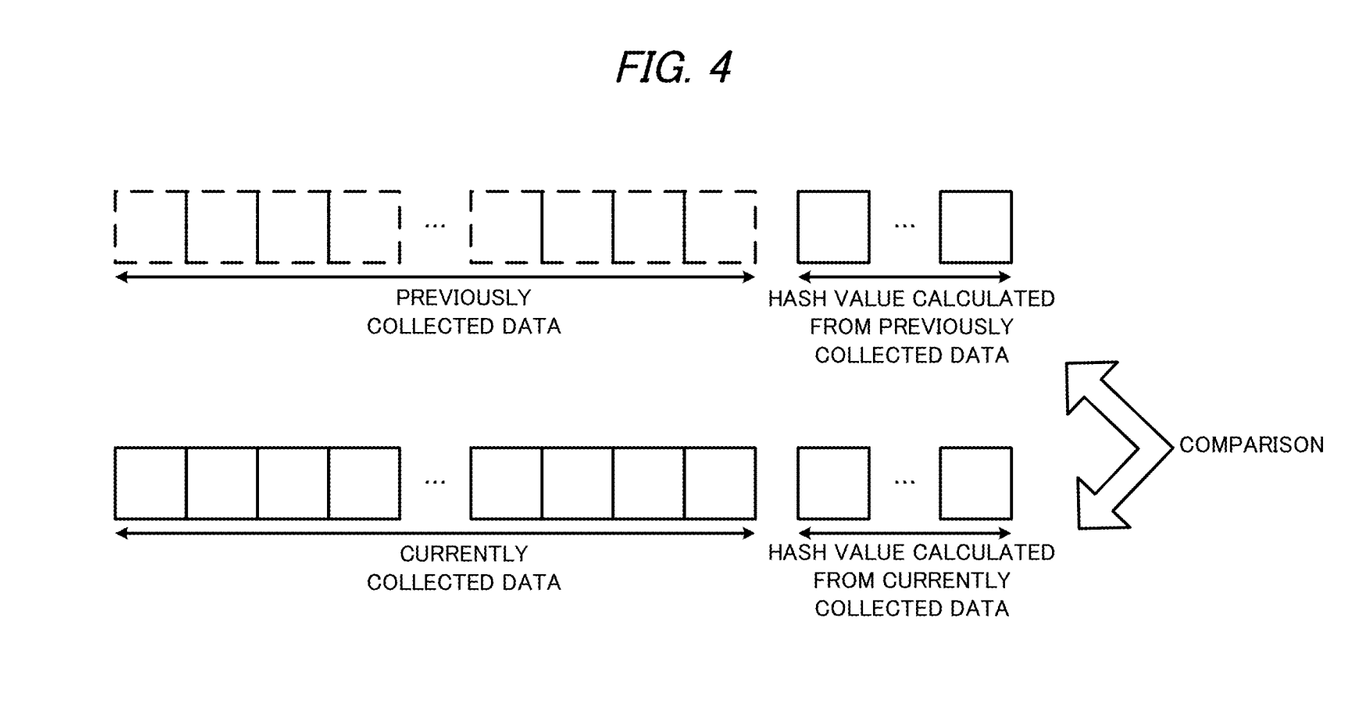
FIG. 4 is a diagram describing a method for determining whether data has been updated in the embodiment.

To determine whether the collected data has been updated, the update determiner 135 compares the hash value calculated from the currently collected data (hereafter, current hash value) with the hash value calculated from the previously collected data (hereafter, previous hash value). The update determiner 135 compares the previous hash value read from the data storage 133 with the hash value calculated from the currently collected data, as shown in FIG. 4. When the current hash value is identical to the previous hash value, the currently collected data is identical to the previously collected data. When the current hash value is identical to the previous hash value, the update determiner 135 determines that the currently collected data is identical to the previously collected data. When the current hash value is not identical to the previous hash value, the update determiner 135 determines that the currently collected data is not identical to the previously collected data. The update determiner 135 notifies the data distribution controller 136 of any update. The data previously collected by the data collector 1 is an example of previous data in an aspect of the present disclosure. The data currently collected by the data collector 1 is an example of current data in an aspect of the present disclosure. The current hash value is an example of a current identification value in an aspect of the present disclosure. The previous hash value is an example of a previous identification value in an aspect of the present disclosure.

When the identification value generator 134 calculates N hash values (N is a positive integer) and the N current hash values and the N previous hash values are all identical, the update determiner 135 notifies the data distribution controller 136 that the data has not been updated.

As instructed by the user to start the processing sequence, the data distribution controller 136 controls data distribution between the components included in the data processing apparatus 100 in accordance with the data representing the data processing sequence setting stored in the setting data storage 110. More specifically, the data distribution controller 136 instructs the data collector 1 to start collection processing. At the same time, the data distribution controller 136 provides the data collector 1 with definition information representing the collection setting stored in the setting data storage 110. The data distribution controller 136 also instructs the data processor 2 to start data processing such as analysis processing and diagnosis processing. At the same time, the data distribution controller 136 provides the data processor 2 with definition information about a data model stored in the model manager 120.

Upon receiving data provided from the first transmitter-receiver 131, the data distribution controller 136 stores the data into the data storage 133 and notifies the update determiner 135 that the data has been collected.

Upon receiving, from the update determiner 135, the notification that the collected data has been updated, the data distribution controller 136 transmits the currently collected data stored in the data storage 133 to the data processor 2, as a transmission destination specified by the data representing the data processing sequence setting, through the second transmitter-receiver 132. The data distribution controller 136 then deletes the hash value calculated from the previously collected data and the currently collected data stored in the data storage 133. In contrast, upon receiving, from the update determiner 135, the notification that the collected data has not been updated, the data distribution controller 136 does not transmit the data to the data processor 2. The data distribution controller 136 then deletes the hash value calculated from the previously collected data and the currently collected data stored in the data storage 133.

As described above, when the data collector 1 provides new data, the data storage 133 stores the current hash value instead of the currently collected data. This hash value is to be used as a hash value calculated from previously collected data in determining whether subsequently collected data has been updated. This structure may reduce the memory usage.

Upon receiving the data provided from the second transmitter-receiver 132, the data distribution controller 136 distributes the data to a destination specified by the data representing the data processing sequence setting. When, for example, the destination for the data is the PLC 603, the data distribution controller 136 transmits the data to the data provider 4 through the first transmitter-receiver 131. The data provider 4 then transmits the data provided from the first transmitter-receiver 131 to the PLC 603. The data provided from the first transmitter-receiver 131 to the data provider 4 includes, for example, data representing a diagnosis result of the FA devices 601 and 602. When the destination for the data is the data processor 2, the data distribution controller 136 transmits the data to the data processor 2 through the second transmitter-receiver 132.

As shown in FIG. 1, the maintenance tool 500 includes an input receiver 510 as a functional component. The input receiver 510 transmits the data representing the collection setting received from the user and the data representing the data processing sequence setting to the data processing apparatus 100. The input receiver 510 also transmits an instruction to start the processing sequence received from the user to the data processing apparatus 100. The functions of the input receiver 510 are implemented by the CPU 55 shown in FIG. 2.

An example of data distribution processing performed by the data distributer 130 with the above structure to distribute data received from the data collector 1 to the data processor 2 will now be described. The CPU 14 shown in FIG. 2 functions as the data distributer 130 shown in FIG. 1 by executing the distribution control program 113.

Figure 5:
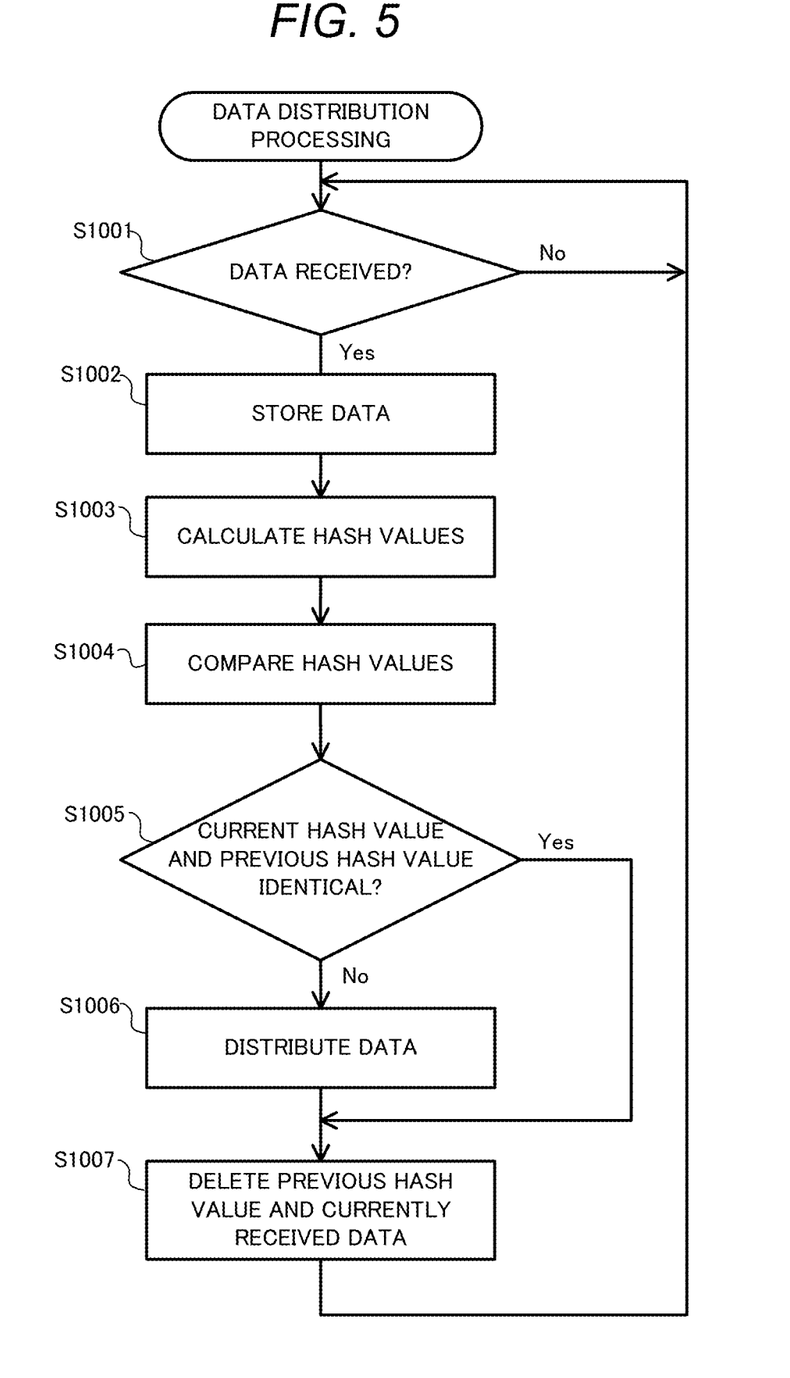
FIG. 5 is a flowchart showing data distribution processing in the embodiment.

As shown in FIG. 5, upon receiving data from the data collector 1 through the first transmitter-receiver 131 (Yes in step S1001), the data distribution controller 136 stores the received data into the data storage 133 (step S1002) and notifies the identification value generator 134 that data has been newly collected. The identification value generator 134 calculates a hash value from the data stored in the data storage 133 (step S1003). The update determiner 135 compares the currently calculated hash value with the previously calculated hash value (step S1004). When the currently calculated hash value and the previously calculated hash value are identical (Yes in step S1005), the update determiner 135 notifies the data distribution controller 136 of the result. Upon receiving the result, the data distribution controller 136 deletes the previously calculated hash value and the currently received data from the data storage 133 (step S1007) and returns to the processing in step 1001.

When the currently calculated hash value and the previously calculated hash value are not identical (No in step S1005), the update determiner 135 notifies the data distribution controller 136 of the result. Upon receiving the result, the data distribution controller 136 distributes the currently received data stored in the data storage 133 to the data processor 2 through the second transmitter-receiver 132 (step S1006). The data distribution controller 136 then deletes the previously calculated hash value and the currently received data from the data storage 133 (step S1007) and returns to the processing in step 1001.

As described above, the data distributer 130 in the data processing apparatus 100 according to the embodiment determines whether the currently received data and the previously received data are identical by comparing hash values calculated from a set of received data pieces. Upon determining that the hash values are not identical, the data distributer 130 distributes the currently received data to the data processor 2. In contrast, when the hash values are identical, the data processing apparatus 100 does not distribute the currently received data to the data processor 2.

This structure may reduce communication traffic between the data distributer 130 and the data processor 2 and also allows the data distributer 130 to perform simpler processing. This may reduce the processing load on the data distributer 130. For 100 data pieces to be collected, for example, a comparison operation is repeated 100 times to compare each currently collected data piece with the corresponding previously collected data piece in a known manner. For, for example, three hash values to be calculated from a set of data pieces, the processing sequence according to the embodiment simply uses an operation for calculating three hash values and an operation for comparing the previous three hash values with the current three hash values.

The data distributer 130 determines whether the previously collected data and the currently collected data are identical by comparing the hash values. This eliminates the previously collected data to be stored in the data storage 133. More specifically, in a comparison of the hash values, the data storage 133 has stored the hash value calculated from the previously collected data, the currently collected data, and the hash value calculated from the currently collected data. The data processing apparatus 100 may have a lower memory capacity.

Modifications

Figure 6:
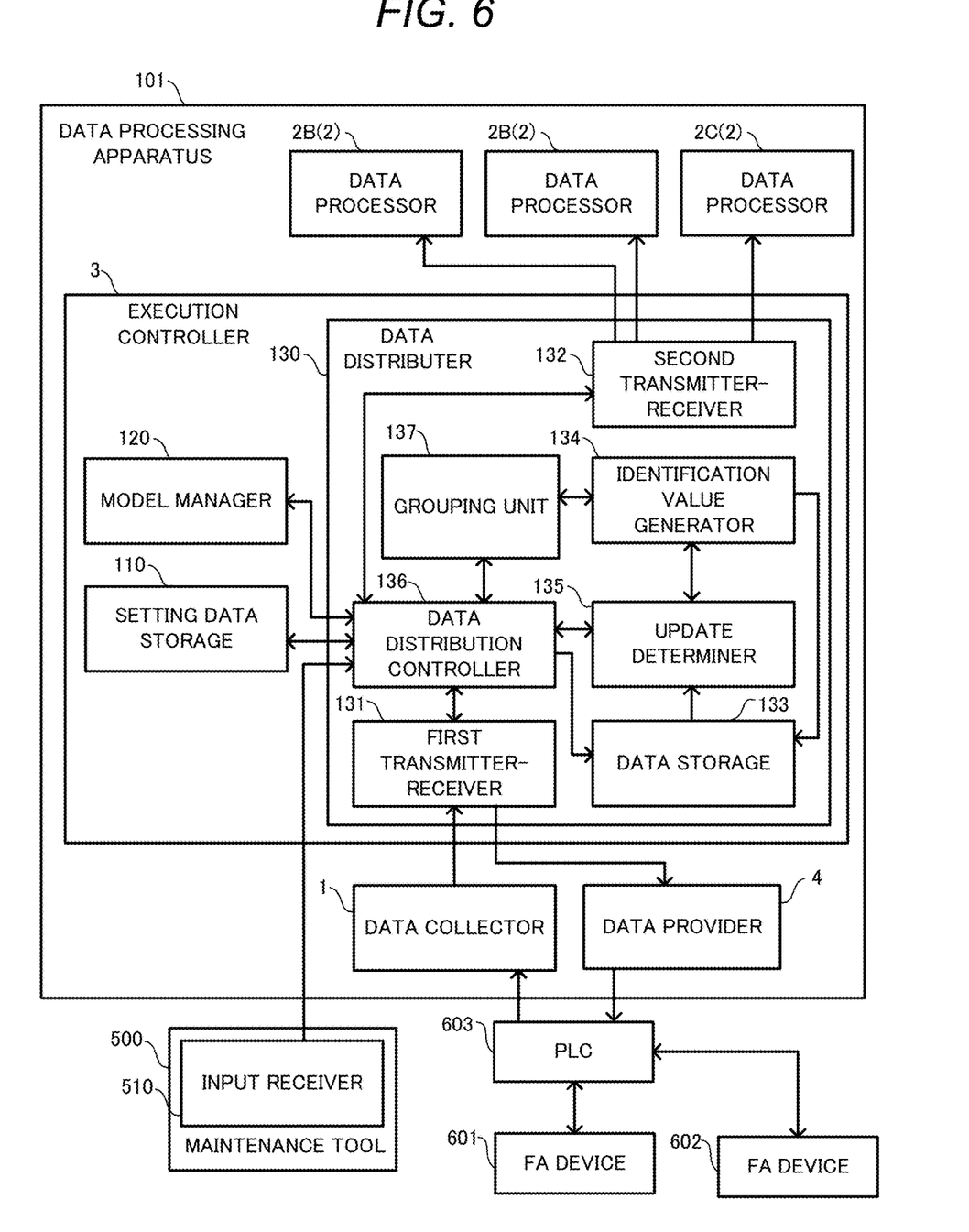
FIG. 6 is a functional block diagram of a data processing apparatus and a maintenance tool according to a modification.

In the embodiment, the identification value generator 134 inputs all the data read from the data storage 133 into the hash function to calculate hash values, but this example is not limitative. FIG. 6 is a block diagram of a data processing apparatus 101 according to a modification. The components different from the embodiment will now be mainly described. The data processing apparatus 101 includes a grouping unit 137 in addition to the components according to the embodiment. The data processing apparatus 101 includes the data processors 2A and 2B and a data processor 2C.

The grouping unit 137 divides collected data into groups. In the modification, the grouping unit 137 divides data into groups in accordance with the definition information about the data model stored in the model manager 120. In this modification, the collected data has the hierarchy shown in FIG. 3. Also, the user has registered a setting for data grouping with the data processing apparatus 101 using the maintenance tool 500 in advance. For example, the grouping unit 137 groups data to be processed by the data processor 2A into a group A, data to be processed by the data processor 2B into a group B, and data to be processed by the data processor 2C into a group C. The data processor 2A is an example of first data processing means in an aspect of the present disclosure. The data processor 2B is an example of second data processing means in an aspect of the present disclosure. The processing performed by the data processor 2A is an example of first data processing in an aspect of the present disclosure. The processing performed by the data processor 2B is an example of second data processing in an aspect of the present disclosure.

Figure 7:
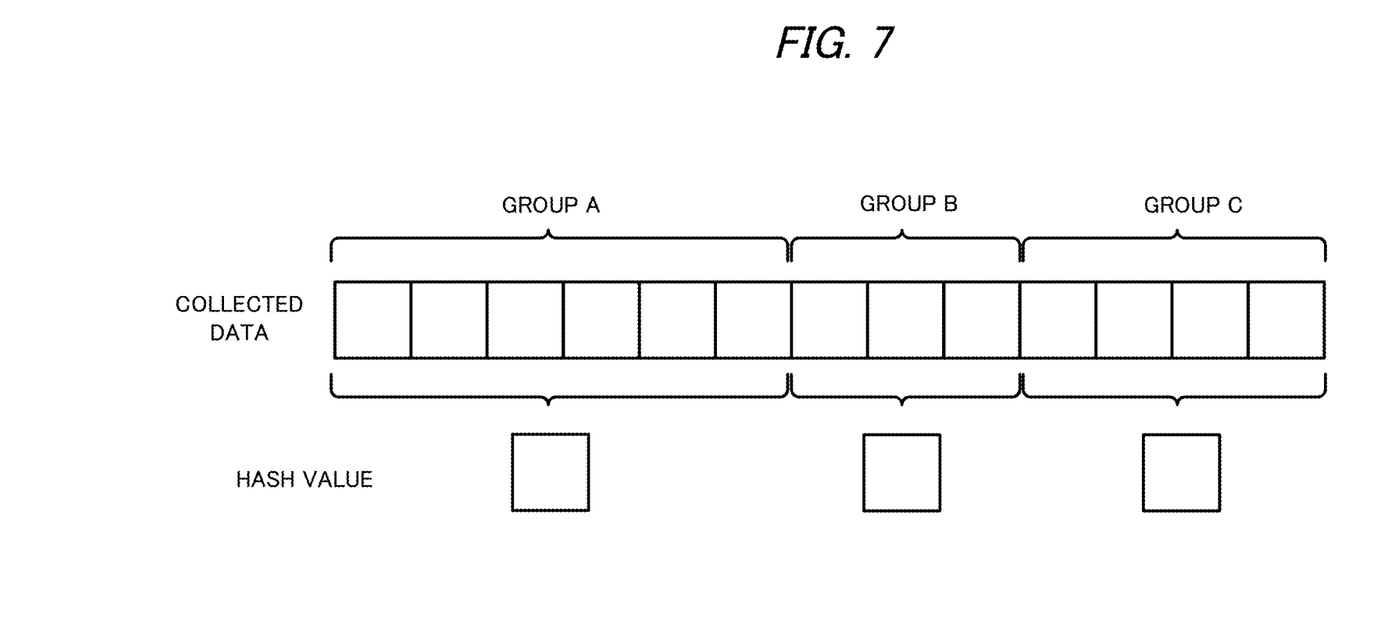
FIG. 7 is a diagram describing a method for determining whether data has been updated in the modification.

The grouping unit 137 provides, to the identification value generator 134, information indicating the correspondence between the collected data and the group. The identification value generator 134 reads the data stored in the data storage 133 in groups and then calculates hash values from the read group-basis data, as shown in FIG. 7. In the illustrated example, the collected data is divided into three groups, and one hash value is calculated for each of the groups. The hash value calculated from the currently collected data included in the group A is an example of a first current identification value in an aspect of the present disclosure. The hash value calculated from the previously collected data included in the group A is an example of a first previous identification value in an aspect of the present disclosure. The hash value calculated from the currently collected data included in the group B is an example of a second current identification value in an aspect of the present disclosure. The hash value calculated from the previously collected data included in the group B is an example of a second previous identification value in an aspect of the present disclosure.

The update determiner 135 determines whether the data has been updated based on the hash value calculated for each group. The update determiner 135 notifies the data distribution controller 136 of the determination result for each group. Based on the notified result, the data distribution controller 136 distributes the updated data of the relevant group to the data processor 2. The data distribution controller 136 does not distribute group data that has not been updated.

The modification may also reduce the communication traffic with the data processor 2 and reduce the processing load on the data distributer 130, in the same manner as in the embodiment.

Although data is divided into groups in accordance with the data model in the above modification, the data may be divided into groups with a different criterion. The grouping unit 137 may simply divide data into groups of predetermined units. For example, the grouping unit 137 may divide data by the predetermined number of data pieces. In another modification, the grouping unit 137 may divide data into groups in meaningful units. In another modification, when multiple data processors 2 are included, the grouping unit 137 may divide data into groups for the data processor 2 to which data is to be distributed.

The data processing apparatus 100 according to the embodiment and the data processing apparatus 101 according to the modification calculate a hash value from a set of data pieces instead of from an individual data piece. In other words, a specific updated data piece may not be identified in the set of data pieces.

However, an updated data piece may be identified by, for example, using a technique for correcting errors in a transmission path. For example, the identification value generator 134 calculates an error correction code as a hash value from the collected data. The method for determining whether the data has been updated is the same as the method used in the embodiment.

When the update determiner 135 determines that the data has been updated, the data distribution controller 136 distributes the data to the data processor 2. At the same time, the data distribution controller 136 transmits the currently collected data together with the previous hash value, or an error correction code calculated from the previously collected data to the data processor 2.

The data processor 2 determines that the data distributed from the data distribution controller 136 contains an error and detects the error from the error correction code added to the data. The data piece at which the error has been detected is the updated data piece.

In the embodiment, the data distributer 130 does not distribute data to the data processor 2 when the current hash values and the previous hash values are all determined to be identical, but this example is not limitative. When, for example, multiple hash values are calculated from the same data and the number of currently calculated hash values identical to previously calculated hash values is less than or equal to a threshold, the data distributer 130 may distribute data to the data processor 2. When the number of currently calculated hash values identical to previously calculated hash values is greater than the threshold, the data distributer 130 may distribute no data to the data processor 2.

In another modification, when multiple hash values are calculated and the ratio of currently calculated hash values being identical to the previously calculated hash values is less than a predetermined ratio, the data distributer 130 may distribute data to the data processor 2. When the ratio of the currently calculated hash values being identical to the previously calculated hash values is greater than or equal to the predetermined ratio, the data distributer 130 may distribute no data to the data processor 2.

In the embodiment, the data processing apparatus 100 includes one data collector 1, but this example is not limitative. The data processing apparatus 100 may include two or more data collectors 1. In this structure, each of the data collectors 1 may simply collect a predetermined type of data. For example, one data collector 1 collects temperature data, and another data collector 1 collects flow rate data. In another modification, each of the data collectors 1 may collect data from an assigned collection target. For example, one data collector 1 collects data from the PLC 603, and another data collector 1 collects data from PLCs other than the PLC 603.

In the embodiment, the data processor 2 communicates data through the execution controller 3, but this example is not limitative. The data processor 2A may mutually communicate. For example, one data processor 2 analyzes data provided from the execution controller 3 and provides the analysis result to another data processor 2. The other data processor 2 may diagnose the FA devices 601 and 602 based on the provided result and provide the diagnosis result to the execution controller 3. The data processor 2 may also perform processing other than analysis processing or diagnosis processing. For example, the data processor 2 may perform processing to be performed before analysis processing, such as missing-value processing and outlier processing, on the collected data.

In the embodiment, the data processing apparatus 100 includes the data collector 1 and the data processor 2, but this example is not limitative. The data collector 1 and the data processor 2 may be included in an apparatus different from the data processing apparatus 100, and the data processing apparatus 100, the apparatus including the data collector 1, and the apparatus including the data processor 2 may cooperate together to function as a data processing system. In this structure, the data processing apparatus 100 may transmit and receive data to and from the data collector 1 and the data processor 2 through, for example, a network.

In the embodiment, the data processing apparatus 100 collects data from the FA devices 601 and 602 through the PLC 603, but this example is not limitative. For example, the data processing apparatus 100 may collect data directly from the FA devices 601 and 602.

In the embodiment, the data processing apparatus 100 collects data and performs predetermined processing on the data to diagnose the FA devices 601 and 602, but this example is not limitative. The data processing apparatus 100 may transmit collected data to a separate analyzer. In this structure, the data processing apparatus 100 and the analyzer may communicate with each other through a network in accordance with a standard, such as 10BASE-T or 100BASE-T.

Although the FA devices 601 and 602 are diagnosed for maintenance, such as preventive maintenance or predictive maintenance, in the embodiment, data collected by the data processing apparatus 100 may be used for other purposes. For example, statistics may be gathered from the data collected from the FA devices 601 and 602, and the statistics may be used to predict a failure of other FA devices.

In the modification, the user uses the maintenance tool 500 to register the setting for data grouping with the data processing apparatus 101, but this example is not limitative. For example, the data processing apparatus 101 may include an input receiver. The input receiver included in the data processing apparatus 101 may receive data representing the setting for data grouping from the user and then store the received data into the setting data storage 110.

Examples of a non-transitory recording medium that records the above programs include a non-transitory computer-readable recording medium, such as a magnetic disk, an optical disk, a magneto-optical disk, a flash memory, a semiconductor memory, and magnetic tape.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

REFERENCE SIGNS LIST

1 Data collector
2A, 2B (2) Data processor
3 Execution controller
4 Data provider
11, 51 Memory
12 First communication interface
13 Second communication interface
14, 55 CPU
19, 59 Bus
52 Communication interface
53 Input device
54 Display device
100, 101 Data processing apparatus
110 Setting data storage
111 Collection program
112 Data processing program
113 Distribution control program
120 Model manager
130 Data distributer
131 First transmitter-receiver
132 Second transmitter-receiver
133 Data storage
134 Identification value generator
135 Update determiner
136 Data distribution controller
137 Grouping unit
500 Maintenance tool
510 Input receiver
511 Maintenance program
601, 602 FA device
603 Programmable logic controller (PLC)
701 Network
702 Communication cable

The invention claimed is:

1. A data processing apparatus comprising:
an identification value generator to generate, from a plurality of data pieces collected from a device, at least one identity identification value with a predetermined sequence, the identity identification value being a value for determining an identity of the plurality of data pieces;
a determiner to determine whether current data and previous data are identical based on whether a current identification value and a previous identification value are identical, the current data including the plurality of data pieces currently collected, the previous data including the plurality of data pieces previously collected, the current identification value including the identity identification value generated from the current data, the previous identification value including the identity identification value generated from the previous data;
a data processor to perform predetermined data processing; and
a distributer to distribute the current data and the previous identification value to the data processor when the determiner determines that the current data and the previous data are not identical, and to delete the current data after completion of the distribution, wherein
the distributer deletes the current data without distributing the current data when the determiner determines that the current data and the previous data are identical, and
the data processor specifies, from the current data and the previous identification value, an updated data piece of the current data, the updated data piece being updated from the previous data.

2. The data processing apparatus according to claim 1, wherein the identification value generator inputs the current data into a predetermined hash function to calculate a hash value as the current identification value and inputs the previous data into the hash function to calculate a hash value as the previous identification value.

3. The data processing apparatus according to claim 2, wherein the identification value generator calculates each hash value from a predetermined data combination selected from the plurality of data pieces collected.

4. The data processing apparatus according to claim 3, wherein the distributer distributes the data combinations to the data processor when the determiner determines that the hash value calculated from the data combination selected from the plurality of data pieces currently collected and the hash value calculated from the data combination selected from the plurality of data pieces previously collected are not identical.

5. The data processing apparatus according to claim 3, wherein the distributer does not distribute the data combinations to the data processor when the determiner determines that the hash value calculated from the data combination selected from the plurality of data pieces currently collected and the hash value calculated from the data combination selected from the plurality of data pieces previously collected are identical.

6. The data processing apparatus according to claim 3, wherein
the data processor includes a first data processor to perform first data processing and a second data processor to perform second data processing,
the identification value generator generates (i) a first current identification value from a first data combination that is selected from the current data and is associated with the first data processor and (ii) a second current identification value from a second data combination that is selected from the current data and is associated with the second data processor, and
the distributer distributes the first data combination selected from the current data to the first data processor when the determiner determines that the first current identification value and a first previous identification value generated from a first data combination that is selected from the previous data and is associated with the first data processor are not identical, and the distributer distributes the second data combination selected from the current data to the second data processor when the determiner determines that the second current identification value and a second previous identification value generated from a second data combination that is selected from the previous data and is associated with the second data processor are not identical.

7. The data processing apparatus according to claim 3, wherein the combination is determined in accordance with a predefined data model.

8. The data processing apparatus according to claim 3, wherein the combination is specified by a user.

9. The data processing apparatus according to claim 2, wherein the distributer does not distribute the current data to the data processor when the identification value generator calculates a plurality of the hash values and the determiner determines that a plurality of current hash values and a plurality of previous hash values are all identical.

10. The data processing apparatus according to claim 2, wherein the distributer distributes the current data to the data processor when the identification value generator calculates a plurality of the hash values and the determiner determines that the number of a plurality of current hash values identical to a plurality of previous hash values is less than or equal to a threshold.

11. The data processing apparatus according to claim 1, further comprising:
a collector to collect the plurality of data pieces from the device.

12. A method implementable by a computer, the method comprising:
generating, from a plurality of data pieces collected from a device, at least one identity identification value with a predetermined sequence, the identity identification value being a value for determining an identity of the plurality of data pieces;
determining whether a current identification value and a previous identification value are identical, the current identification value being the identity identification value generated from the plurality of data pieces currently collected, the previous identification value being the identity identification value generated from the plurality of data pieces previously collected;
distributing the plurality of data pieces currently collected and the previous identification value when the current identification value and the previous identification value are not identical, and deleting, after completion of the distribution, the plurality of data pieces currently collected;
deleting the plurality of data pieces currently collected without distributing the plurality of data pieces currently collected when the current identification value and the previous identification value are identical; and
specifying, from the plurality of data pieces currently collected and the previous identification value, an updated data piece of the plurality of data pieces currently collected, the updated data piece being updated from the plurality of data pieces previously collected.

13. A non-transitory computer readable recording medium storing a program for causing a computer to perform operations comprising:
generating, from a plurality of data pieces collected from a device, at least one identity identification value with a predetermined sequence, the identity identification value being a value for determining an identity of the plurality of data pieces;
determining whether a current identification value and a previous identification value are identical, the current identification value being the identity identification value generated from the plurality of data pieces currently collected, the previous identification value being the identity identification value calculated from the plurality of data pieces previously collected;

distributing the plurality of data pieces currently collected and the previous identification value when the current identification value and the previous identification value are not identical, and deleting, after completion of the distribution, the plurality of data pieces currently collected;

deleting the plurality of data pieces currently collected without distribution of the plurality of data pieces currently collected when the current identification value and the previous identification value are identical; and specifying, from the plurality of data pieces currently collected and the previous identification value, an updated data piece of the plurality of data pieces currently collected, the updated data piece being updated from the plurality of data pieces previously collected.

* * * * *